United States Patent
Uchida et al.

(10) Patent No.: US 10,930,310 B1
(45) Date of Patent: Feb. 23, 2021

(54) DATA STORAGE DEVICE SORTING ACCESS COMMANDS BASED ON PEAK CURRENT FOR MULTIPLE ACTUATORS

(71) Applicant: Western Digital Technologies, Inc., San Jose, CA (US)

(72) Inventors: Hiroshi Uchida, Kanagawa (JP); Hidehiko Numasato, Kanagawa (JP); KeXiu Liu, Foothill Ranch, CA (US); Shrey Khanna, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/781,216

(22) Filed: Feb. 4, 2020

(51) Int. Cl.
*G11B 5/09* (2006.01)
*G11B 5/55* (2006.01)
*G06F 3/06* (2006.01)

(52) U.S. Cl.
CPC .......... *G11B 5/5547* (2013.01); *G06F 3/0625* (2013.01); *G06F 3/0659* (2013.01); *G11B 5/5578* (2013.01)

(58) Field of Classification Search
None
See application file for complete search history.

(56) References Cited

U.S. PATENT DOCUMENTS

| | | | | |
|---|---|---|---|---|
| 5,570,332 A * | 10/1996 | Heath | ................... | G06F 3/0601 369/30.1 |
| 5,664,143 A * | 9/1997 | Olbrich | ................ | G06F 3/0601 711/112 |
| 6,571,298 B1 * | 5/2003 | Megiddo | ............... | G06F 3/0674 710/5 |
| 6,657,811 B1 * | 12/2003 | Codilian | .............. | G11B 5/5526 360/69 |
| 8,868,798 B1 * | 10/2014 | Marshak | ................. | G06F 3/061 710/29 |
| 10,014,018 B1 | 7/2018 | Kiyonaga et al. | | |
| 10,049,691 B1 | 8/2018 | Gaertner et al. | | |
| 10,176,840 B1 | 1/2019 | Johnson et al. | | |
| 2003/0158996 A1 * | 8/2003 | Espeseth | ............... | G06F 3/0601 711/112 |
| 2006/0288156 A1 * | 12/2006 | Fish | ....................... | G06F 3/0676 711/112 |

* cited by examiner

*Primary Examiner* — Peter Vincent Agustin

(57) ABSTRACT

A data storage device comprising a first actuator configured to actuate a first head over a first disk surface, and a second actuator configured to actuate a second head over a second disk surface. A plurality of access commands are received from a host, and a cost metric is computed for executing a seek to execute each access command of the plurality of access commands, wherein the cost metric is based on an access latency of the seek, a power consumption of the seek, and an estimated combined current draw of the first and second actuators during the seek. The access commands are sorted into an execution order based on the cost metrics computed for the access commands.

20 Claims, 9 Drawing Sheets

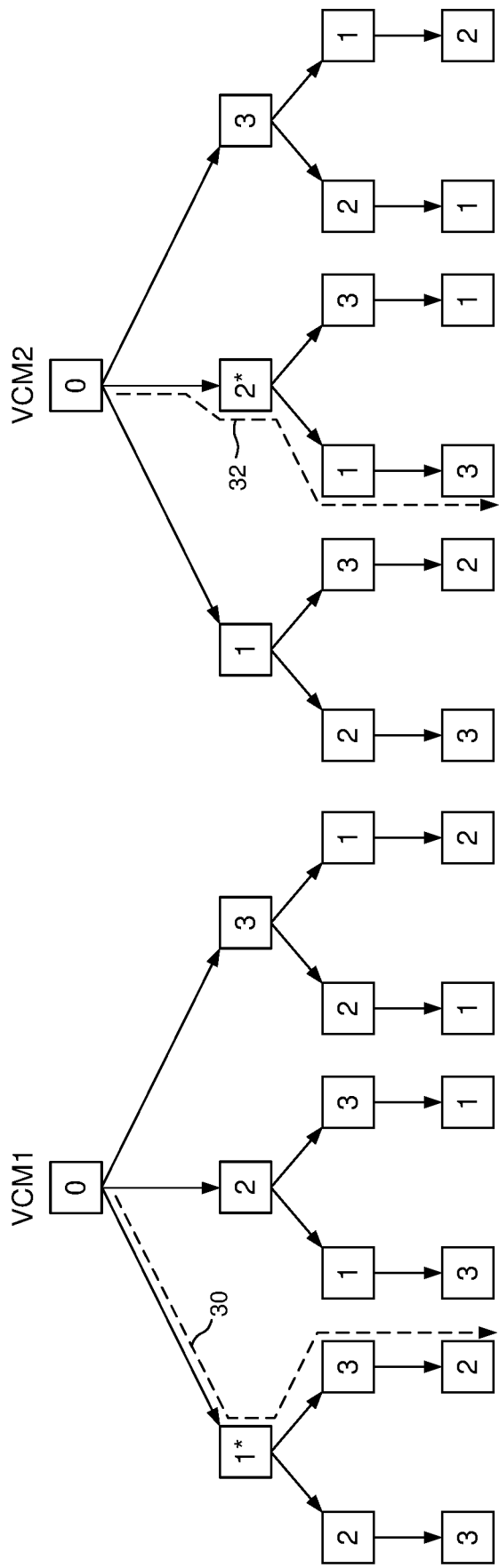

DATA STORAGE DEVICE SORTING ACCESS COMMANDS BASED ON PEAK CURRENT FOR MULTIPLE ACTUATORS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 3A shows an embodiment wherein a command queue is maintained for each actuator.

FIGS. 3B and 3C show an embodiment wherein an execution order for each actuator results in a concurrent seek of at least two actuators.

DETAILED DESCRIPTION

Figure 1:
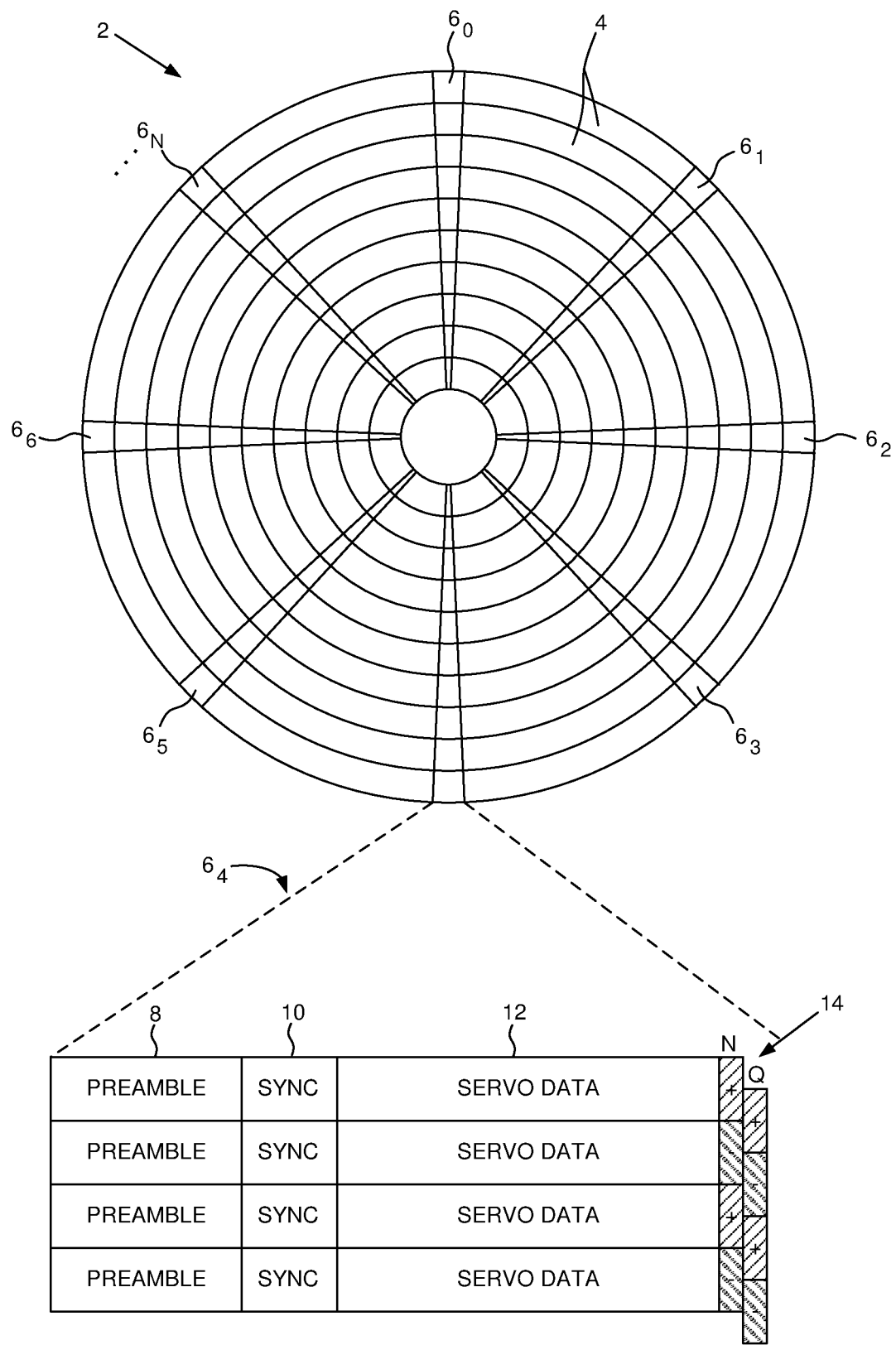
FIG. 1 shows a prior art disk format comprising a plurality of servo tracks defined by servo sectors.
Figure 2A:
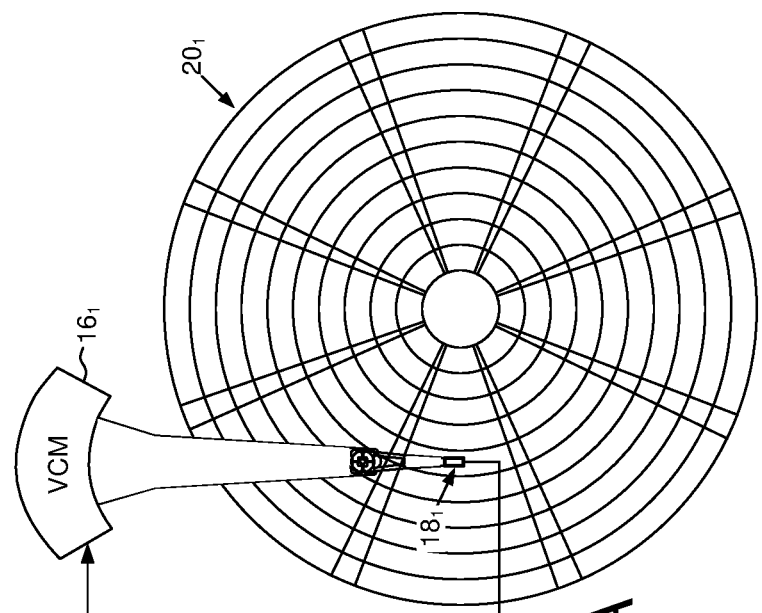
FIGS. 2A and 2B show a data storage device in the form of a disk drive according to an embodiment comprising multiple actuators configured to concurrently actuate heads over respective disk surfaces.
Figure 2B:
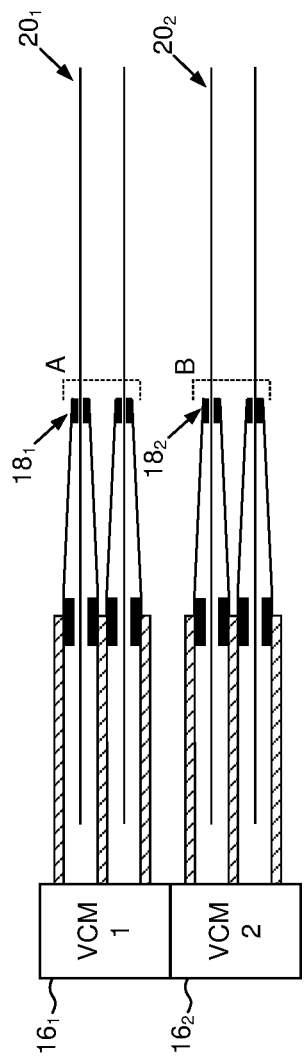
Figure 2C:
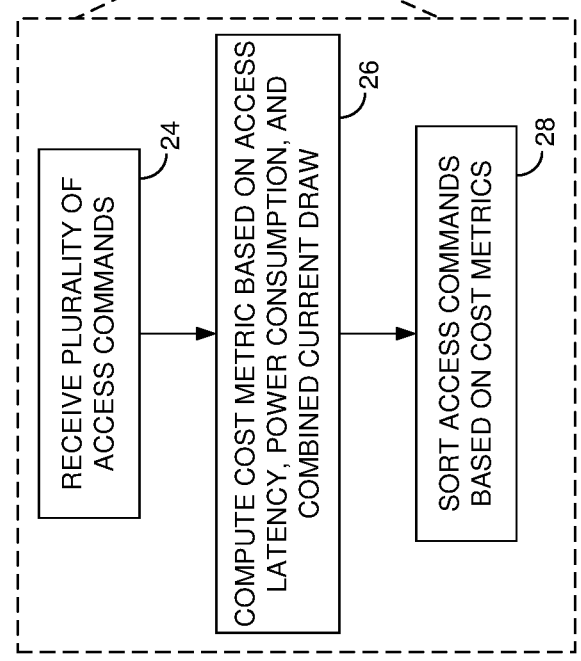
FIG. 2C is a flow diagram according to an embodiment wherein access commands are sorted into an execution order based on a cost metric of each corresponding seek computed from an access latency, a power consumption, and an estimated combined current draw from multiple actuators.

FIGS. 2A and 2B show a data storage device in the form of a disk drive according to an embodiment comprising a first actuator $16_1$ configured to actuate a first head $18_1$ over a first disk surface $20_1$, and a second actuator $16_2$ configured to actuate a second head $18_2$ over a second disk surface $20_2$. The disk drive further comprises control circuitry 22 configured to execute the flow diagram of FIG. 2C, wherein a plurality of access commands are received from a host (block 24), and a cost metric is computed for executing a seek to execute each access command of the plurality of access commands, wherein the cost metric is based on an access latency of the seek, a power consumption of the seek, and an estimated combined current draw of the first and second actuators during the seek (block 26). The access commands are sorted into an execution order based on the cost metrics computed for the access commands (block 28).

Any suitable actuators may be employed to seek the heads over respective disk surfaces, wherein in the embodiment of FIG. 2A a first voice coil motor (VCM) $16_1$ rotates a first set of actuator arms about a pivot, and a second VCM $16_2$ rotates a second set of actuator arms about the pivot in a configuration referred to as a dual actuator. In other embodiments, each VCM may rotate respective actuator arms about independent pivots (e.g., first and second VCMs mounted at opposite sides of the disks). In addition, each head may be actuated by any suitable secondary actuator, such as a secondary actuator configured to actuate a suspension relative to the actuator arm, and/or a secondary actuator configured to actuate the head relative to the suspension.

In one embodiment, the amount of current the disk drive may draw from a supply voltage may be limited due, for example, to a current limit of a power supply that is powering the disk drive. When the current limit is exceeded, it may cause a supply voltage to fall below an emergency threshold causing an emergency power-fail procedure to retract the heads from the disks before the air bearing dissipates. When the seek profiles of the multiple actuators overlap, and particularly when the acceleration or deceleration phase of the seek profiles overlap, the combined current draw of both actuators may cause an overcurrent condition.

Accordingly in one embodiment when sorting the access commands into an execution order, an estimated combined current draw of the actuators is included in the cost metric of the sorting algorithm in order to avoid the overcurrent condition.

FIGS. 3A-3B show an embodiment wherein the control circuitry 22 maintains a command queue for each VCM, wherein the access commands of each command queue are sorted into an execution order based on a suitable cost metric associated with seeking the heads. Conventionally, the cost metric included different performance aspects such as the access latency or power consumption of a seek. That is, the sorting algorithm may sort the access commands in a command queue in an order that minimizes the accumulated cost metrics using a suitable search tree. In the example of FIG. 3A, the command queue stores three pending commands together with the current command being executed. FIG. 3B shows a corresponding tree search for the first VCM $16_1$, and FIG. 3C shows a corresponding search tree for the second VCM $16_2$. Each branch of the search tree has an associated cost metric, wherein the cost metric is accumulated for each possible path through the search tree. The pending commands in the command queue are sorted into an execution order based on the path through the search tree having the smallest accumulated cost metric.

In one embodiment, the cost metric associated with each branch of the search tree includes an estimated combined current draw of the VCMs. Referring to the example of FIGS. 3B and 3C, the execution order corresponding to path 30 through the first search tree and the execution order corresponding to path 32 through the second search tree include a collision due to concurrently seeking both VCMs in order to access the data tracks associated with command 1 of the first search tree and command 2 of the second search tree. Accordingly in one embodiment, the combined current draw of both VCMs due to the concurrent seek may cause an overcurrent condition, and therefore the cost metric associated with selecting path 30 and path 32 as the execution order for the VCMs is increased. The cost metric may be increased in any suitable manner, such as by adding a predetermined offset or by adding an offset that is proportional to an amplitude of the estimated combined current draw, proportional to a duration the amplitude exceeds a threshold, etc.

In many cases, the increased cost metric associated with two paths through the search trees that include a collision means at least one of the paths will not be selected as the optimal execution order. That is, in many cases the smallest accumulated cost metric for the selected paths will not result in a collision between the two paths. In some cases, however, the minimum accumulated cost metric for the paths through both search trees will include a collision. Referring again to the above example, it may be that the path 30 through the first search tree of FIG. 3B and the path 32 through the second search tree of FIG. 3C may correspond to the minimum accumulated cost metric even though increased due to the collision. In one embodiment, when the paths selected through the search trees includes a collision, at least one of the seek profiles is modified in order to avoid the overcurrent condition when concurrently seeking the VCMs. The seek profile may be modified in any suitable manner to avoid the overcurrent condition, such as by decreasing an acceleration current during an acceleration phase of the seek or decreasing a deceleration current during a deceleration phase of the seek.

Figure 4A:
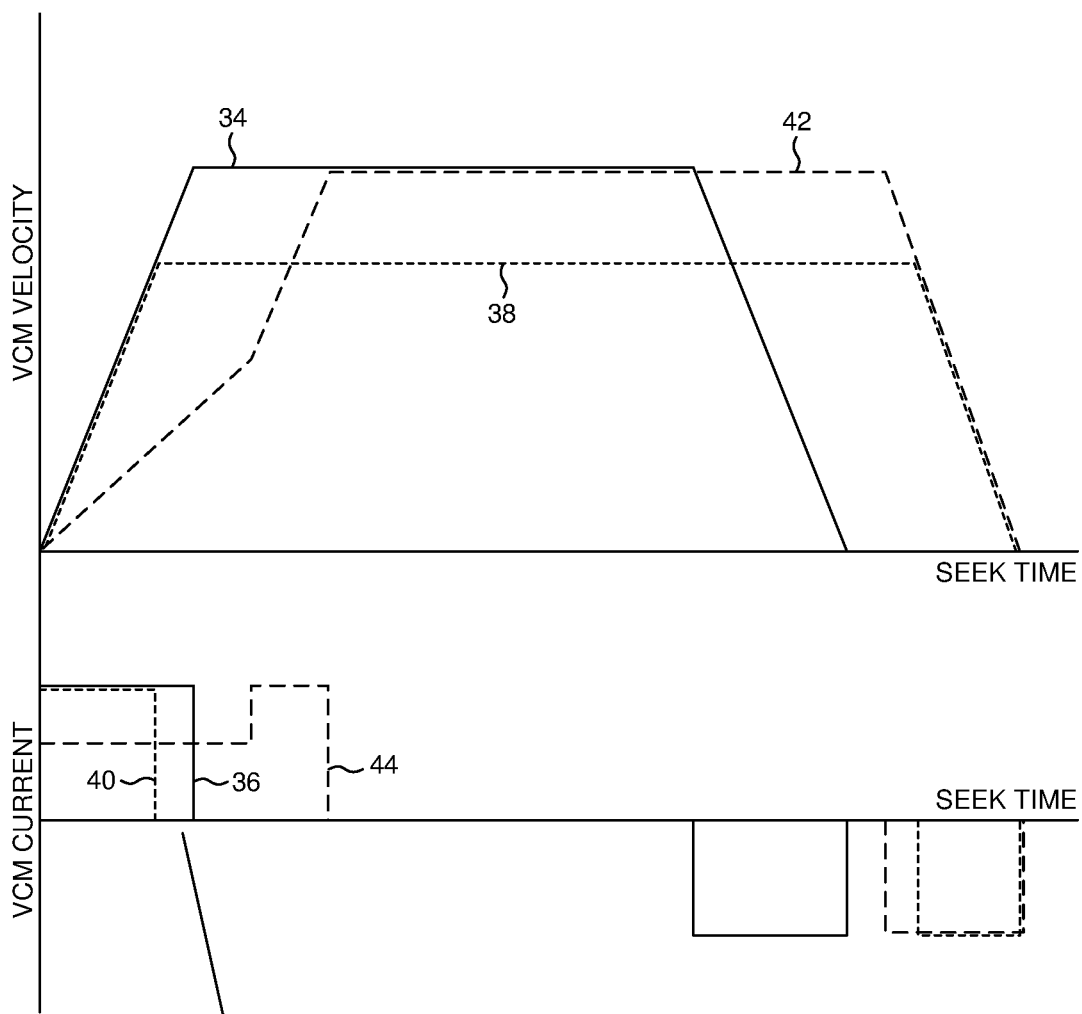
FIGS. 4A and 4B show an embodiment wherein an acceleration current of the second actuator is decreased during an acceleration phase in order to avoid an overcurrent condition during a concurrent seek.
Figure 4B:
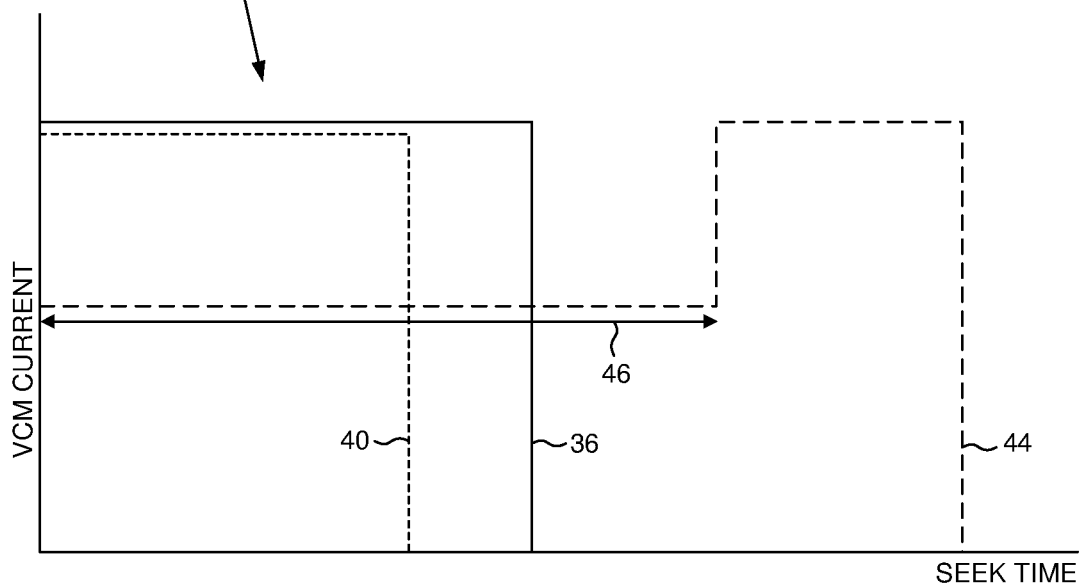

FIG. 4A shows an example wherein a seek of the first VCM $16_1$ may be based on a normal seek profile 34 and corresponding driving current 36, and a seek of the second VCM $16_2$ may be based on a de-rated seek profile 38 and corresponding driving current 40. A de-rated seek profile achieves a just-in-time (JIT) seek wherein the head arrives at the target data track just before reaching the target data sector of the access command, thereby reducing the power consumption of the seek. That is when there is sufficient time for the head to reach a target data track, the seek profile may be de-rated so that the coast velocity is less than a maximum coast velocity, thereby reducing the power consumed during the acceleration and deceleration phase of the seek. In the example of FIG. 4A, the normal seek profile 34 of the first VCM $16_1$ and the de-rated seek profile 38 of the second VCM $16_2$ may initiate concurrently leading to an overcurrent condition due to the combined current draw during the acceleration phase of the seeks (a magnified view of the acceleration phase is shown in FIG. 4B). In order to avoid the overcurrent condition, the control circuitry 22 adjusts the de-rated seek profile 38 for the second VCM $16_2$ to seek profile 42 with corresponding driving current 44. In this embodiment, the de-rated seek profile 38 is adjusted by decreasing the acceleration current applied to the second VCM $16_2$ for a clamp interval 46 as shown in FIG. 4B. This decrease in acceleration during the clamp interval 46 avoids the overcurrent condition by decreasing the combined current draw of both VCMs. In one embodiment, after the clamp interval 46 the control circuitry 22 increases the acceleration current applied to the second VCM $16_2$ (as shown in FIG. 4B) so that the second VCM $16_2$ reaches the maximum coast velocity, thereby causing the second VCM to "catch up" the lost seek distance due to clamping the acceleration during the clamp interval 46. In one embodiment, the clamp interval 46 is configured by the control circuitry 22 so that the head may decelerate along the same trajectory of the de-rated, JIT seek profile 38. In this manner, the power consumption of the adjusted seek profile 42 may be minimized while maintaining the same seek performance (seek time) as the de-rated, JIT seek profile 38.

Figure 5A:
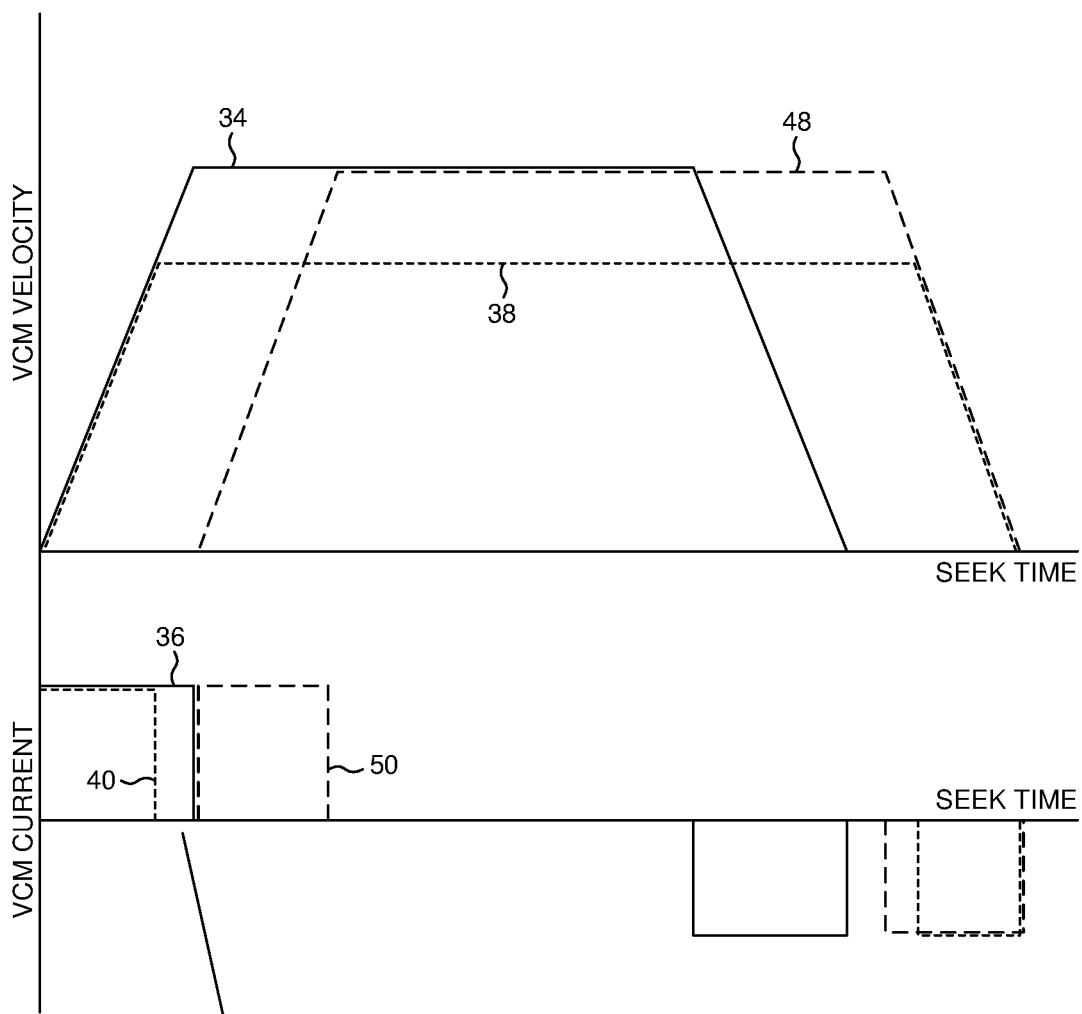
FIGS. 5A and 5B show an embodiment wherein an acceleration phase of the second actuator is delayed in order to avoid an overcurrent condition during a concurrent seek.
Figure 5B:
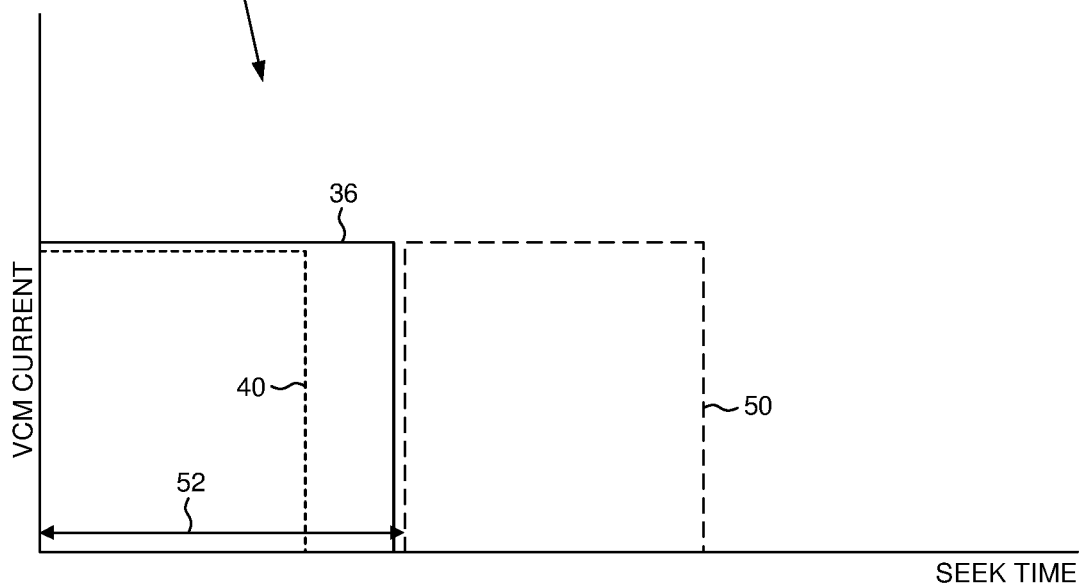

FIG. 5A shows an embodiment wherein the de-rated seek profile 38 of the second VCM $16_2$ is modified to seek profile 48 with corresponding driving current 50, wherein the acceleration phase of the modified seek profile 48 is delayed by a delay interval 52 as shown in FIG. 5B. In this manner, delaying the acceleration phase of the seek profile 48 avoids the driving currents 36 and 50 of the first and second VCMs from overlapping, thereby avoiding the overcurrent condition. In the example of FIG. 5A, the modified seek profile 48 causes the second VCM $16_2$ to reach a maximum coast velocity in order to "catch up" the lost seek distance due to delaying the acceleration phase, thereby enabling the head to decelerate along the same trajectory of the de-rated, JIT seek profile 38. In this manner, the power consumption of the adjusted seek profile 48 may be minimized while maintaining the same seek performance (seek time) as the de-rated, JIT seek profile 38.

Figure 6A:
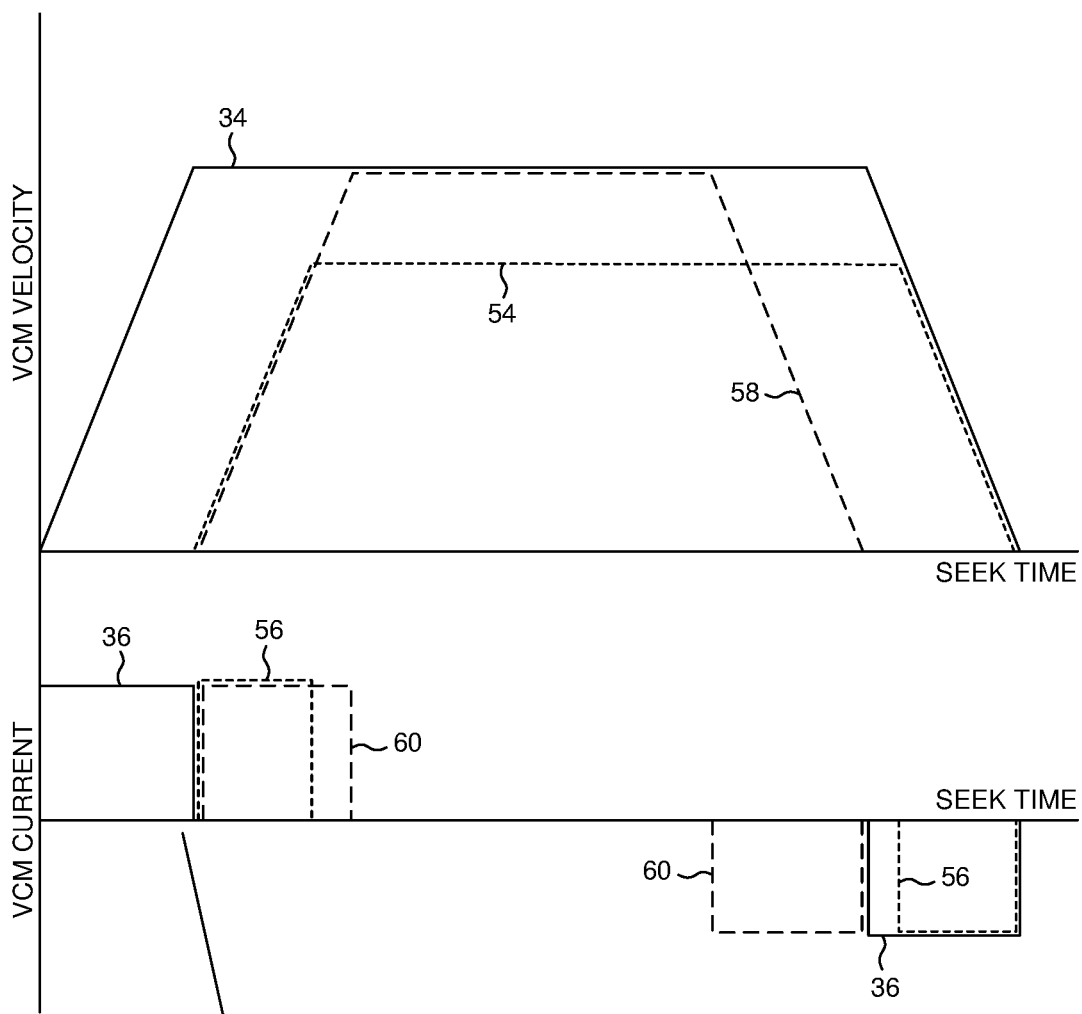
FIGS. 6A and 6B show an embodiment wherein an acceleration current of the second actuator is increased and a deceleration phase is executed earlier in order to avoid an overcurrent condition during a concurrent seek.
Figure 6B:
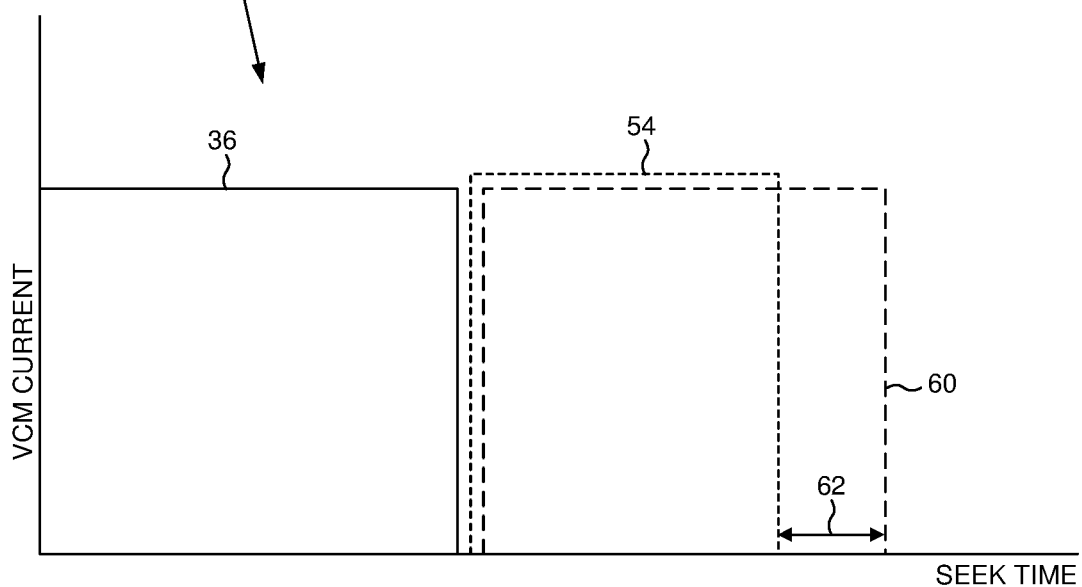

In one embodiment, the access commands received from the host may be queued in a command queue and sorted into an optimal execution order using a rotational position optimization (RPO) algorithm. The RPO algorithm may be adapted over time based on a measured seek time for each seek operation (i.e., each seek length). That is, the estimated seek times for each seek length in the RPO algorithm may be adjusted over time based on the actual seek times measured after each seek operation. In one embodiment, when a seek profile is modified to avoid an overcurrent condition as described above, the measured seek time for the seek may still be used to adapt the RPO algorithm. For example, delaying a seek profile as described above with reference to FIG. 5A may change a de-rated seek profile into a normal seek profile that may still be a typical seek profile under other operating conditions. Therefore the measured seek time for the seek operation may still be used to adapt the RPO algorithm. FIG. 6A shows an embodiment wherein the deceleration phase of a normal seek profile 34 with corresponding driving current 36 overlaps with the deceleration phase of a de-rated seek profile 54 with corresponding driving current 56, thereby resulting in an overcurrent condition during the deceleration phases of the seeks. In order to avoid the overcurrent condition, the de-rated seek profile 54 is modified to seek profile 58 with corresponding driving current 60 which extends the acceleration interval during the acceleration phase by interval 62 as shown in FIG. 6B. Extending the acceleration interval causes the second VCM $16_2$ to reach a maximum coast velocity, thereby enabling the deceleration phase of the modified seek profile 58 to begin earlier as shown in FIG. 6A so as to avoid the overlap in the deceleration driving currents during the deceleration phase of the concurrent seeks.

In one embodiment when the seek profiles for both VCMs are normal seek profiles (not de-rated or slightly de-rated), and both seek profiles terminate near the inner or outer diameter of the disk, the cost metric for one of the seek profiles may be modified by adding a revolution of latency to one of the seeks. That is, a normal seek profile may be modified based on an additional revolution of latency, which in one embodiment means the normal seek profile may be converted into a de-rated seek profile due to the increased seek time. If an overcurrent condition still occurs due to concurrently seeking both VCMs (e.g., during the acceleration phase of concurrent seeks), the de-rated seek profile may be modified as described above in order to avoid the overcurrent condition.

Figure 7A:
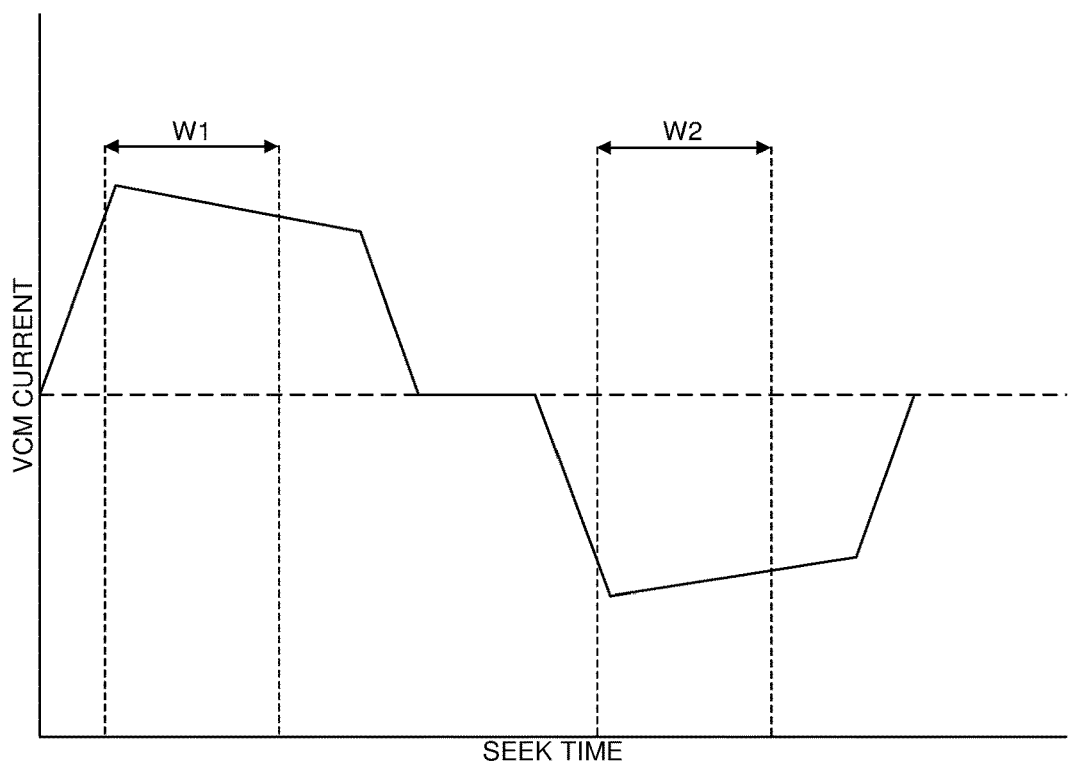
FIGS. 7A and 7B show an embodiment wherein a peak current window is estimated for each actuator relative to a seek length, wherein the peak current windows are evaluated to predict an overcurrent condition during a concurrent seek.

Any suitable technique may be employed to estimate the current draw of either VCM during a seek operation. FIG. 7A shows an embodiment wherein for each VCM a first peak current window W1 is estimated for the acceleration phase of a seek profile, and a second peak current window W2 is estimated for the deceleration phase of the seek profile. The combined current draw for both actuators is then estimated based on an overlap of the peak current windows. In one embodiment, there may be a seek time offset between the VCMs resulting in a partial overlap of the peak current windows. For example, a seek of the first VCM $16_1$ may be initiated and then after a small delay a seek of the second VCM $16_2$ may be initiated. The amount of overlap between the peak current windows may then be estimated by time shifting the peak current windows for the second VCM $16_2$ before estimating the degree of overlap. When an overlap is detected, an overcurrent condition is assumed during the duration of the overlap. In one embodiment, the width of each peak current window W1 or W2 may be calibrated and optionally tuned over time in order to ensure an overlap of the windows accurately predicts an overcurrent condition.

Figure 7B:
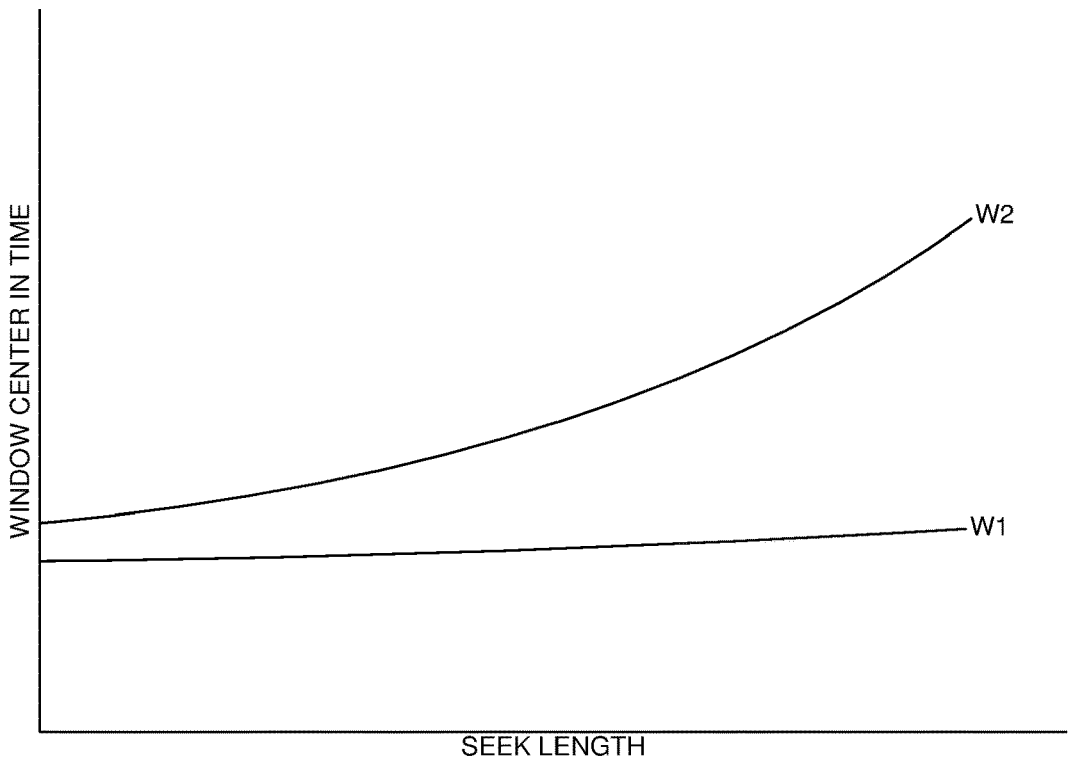

In one embodiment, a center of a peak current window W1 or W2 may shift in time relative to the seek time for a given seek length. An example of this embodiment is shown in FIG. 7B wherein the center of each peak current window W1 and W2 shifts in time relative the length of each seek operation. In one embodiment, the shift of the peak current windows W1 and W2 is calibrated by measuring the shift for different seek lengths during a calibration procedure, and then generating a suitable function (e.g., a polynomial) for estimating the window shift based on the seek length. When sorting the access commands into an execution order based on the search tree as described above, the combined current draw of the VCMs may be estimated by computing the center of the peak current windows W1 and W2 for each VCM based on the seek length of the corresponding access command.

In one embodiment, when sorting the access commands into an optimal execution order, there may be insufficient time to estimate the combined current draw of the VCMs for every access command in every path through the search tree, particularly as the depth of the search tree increases (length of the command queue increases). According in one embodiment, the access commands may be first sorted into a plurality of candidate execution orders based on a cost metric that does not include the estimated combined current draw of the VCMs. An accumulated cost metric may then be computed for each candidate execution order based on a cost metric that includes the estimated combined current draw of the VCMs as described above, wherein the candidate execution order having the smallest accumulated cost metric is then selected as the optimal execution order.

Figure 8:
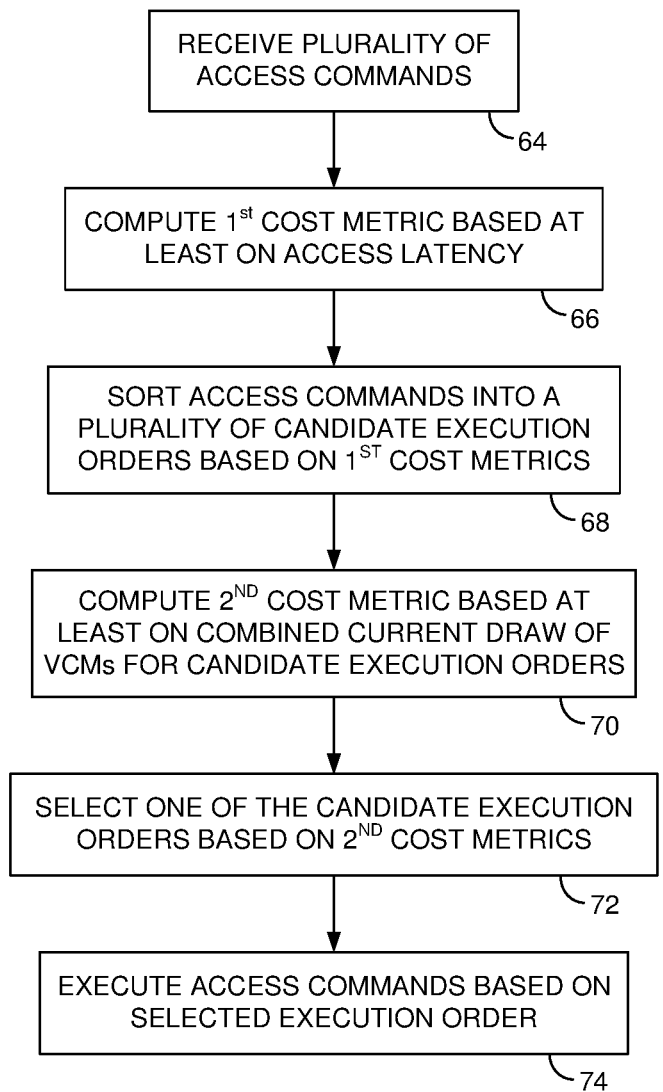
FIG. 8 is a flow diagram according to an embodiment wherein the access commands are first sorted into a plurality of candidate execution orders independent of the combined current draw of the actuators, and then an execution order is selected from the candidates based on the estimated combined current draw.

An example of this embodiment is understood with reference to the flow diagram of FIG. 8, wherein a plurality of access commands received from a host are stored in respective command queues for each VCM (block 64). When sorting the access commands into an execution order, a first cost metric is generated for each branch of a search tree as described above, wherein the first cost metric includes at least an access latency associated with executing an access command but does not include an estimated combined current draw of the VCMs (block 66). The access commands are then sorted into a plurality of candidate execution orders based on the first cost metric (block 68). For each candidate execution order, a second cost metric is computed based on at least the estimated combined current draw of the VCMs (block 70), and one of the candidate execution orders is selected as the optimal execution order based on the second cost metric (e.g., the candidate execution order having the smallest accumulated cost metric). In one embodiment, the final cost metric for selecting the optimal execution order may be generated by adding the second cost metric to the first cost metric.

Figures 9A, 9B:
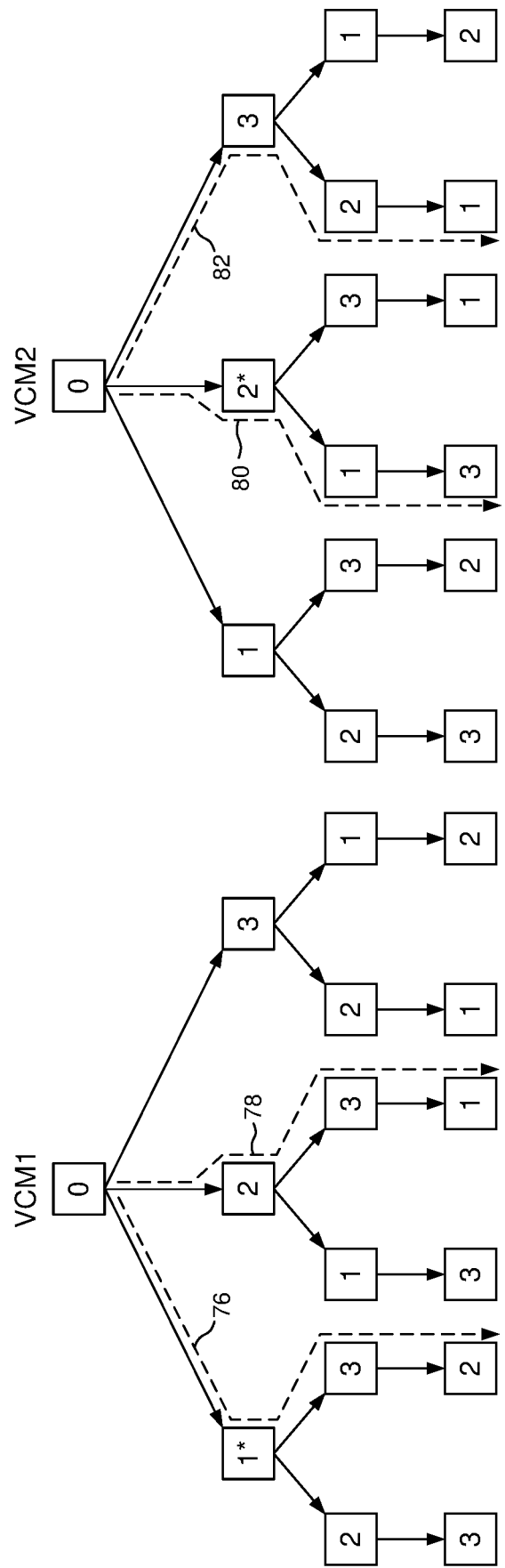
FIGS. 9A and 9B show an embodiment wherein the access commands of two actuators are first sorted into two candidate execution orders, and then an execution order is selected from the candidates based on the estimated combined current draw of the actuators.

FIGS. 9A and 9B illustrate an example of this embodiment wherein the access commands of each command queue for each VCM are first processed using a search tree based on a first cost metric that does not include the estimated combined current draw of the VCMs. At least two candidate execution orders (two paths) through each search tree are selected based on the first cost metric. For example, a predetermined number of execution orders having the smallest accumulated first cost metric are selected as the candidate execution orders. In the example of FIG. 9A, candidate execution orders 76 and 78 are selected, and in the example of FIG. 9B, candidate execution orders 80 and 82 are selected. A second cost metric is then computed for the candidate execution orders which takes into account the estimated combined current draw of the VCMs as described above. When a collision is detected due to the concurrent seek of the VCMs, the second cost metric may or may not change the candidate execution order having the smallest accumulated cost metric as described above. Sorting the access commands into an optimal execution order by first generating candidate execution orders and then considering the combined current draw of the VCMs reduces the execution time of the sort algorithm.

In one embodiment, the data storage device may comprise more than two actuators (e.g., more than two VCMs) wherein concurrently seeking two or more of the actuators may result in an overcurrent condition. Accordingly the aspects in the embodiments described above may be extended to account for concurrently seeking more than two actuators, such as by modifying more than one seek profile in order to avoid an overcurrent condition.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power large scale integrated (PLSI) circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, a hybrid disk drive comprising non-volatile semiconductor memory, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a first disk surface;
a first head;
a first actuator configured to actuate the first head over the first disk surface;
a second disk surface;
a second head;
a second actuator configured to actuate the second head over the second disk surface; and
control circuitry configured to:
receive a plurality of access commands from a host;
compute a cost metric for executing a seek to execute each access command of the plurality of access commands, wherein the cost metric is based on an access latency of the seek, a power consumption of the seek, and an estimated combined current draw of the first and second actuators during the seek; and
sort the access commands into an execution order based on the cost metrics computed for the access commands.

2. The data storage device as recited in claim 1, wherein the control circuitry is further configured to:
estimate a peak current window for the seek of each access command; and
estimate the combined current draw of both actuators based on an overlap of the peak current windows.

3. The data storage device as recited in claim 2, wherein the peak current window is estimated based on a length of the seek.

4. The data storage device as recited in claim 2, wherein the peak current window corresponds to at least one of an acceleration phase of the seek or a deceleration phase of the seek.

5. The data storage device as recited in claim 1, wherein when the execution order results in a concurrent seek of the first and second actuators, the control circuitry is further configured to modify a seek profile of at least the second actuator.

6. The data storage device as recited in claim 5, wherein the control circuitry is further configured to modify the seek profile of at least the second actuator by decreasing an acceleration current applied to the second actuator for a clamp interval of an acceleration phase of the seek profile.

7. The data storage device as recited in claim 6, wherein the control circuitry is further configured to modify the seek profile of at least the second actuator by increasing the acceleration current applied to the second actuator after the clamp interval.

8. The data storage device as recited in claim 5, wherein the control circuitry is further configured to modify the seek profile of at least the second actuator by delaying an acceleration phase of the seek profile.

9. The data storage device as recited in claim 8, wherein the control circuitry is further configured to modify the seek profile of at least the second actuator by increasing a constant velocity phase of the seek profile.

10. A data storage device comprising:
a first disk surface;
a first head;
a first actuator configured to actuate the first head over the first disk surface;
a second disk surface;
a second head;
a second actuator configured to actuate the second head over the second disk surface; and
control circuitry configured to:
  receive a plurality of access commands from a host;
  compute a first cost metric for executing a seek to execute each access command of the plurality of access commands, wherein the first cost metric is based on at least an access latency of the seek;
  sort the access commands into a plurality of candidate execution orders based on the first cost metrics computed for the access commands;
  compute a second cost metric for executing a seek to execute each access command in each of the candidate execution orders, wherein the second cost metric is based on an at least an estimated combined current draw of the first and second actuators during the seek;
  select one of the candidate execution orders based on the second cost metrics; and
  execute the access commands based on the selected execution order.

11. The data storage device as recited in claim 10, wherein at least one of the first cost metric or the second cost metric is further based on a power consumption of the seek.

12. The data storage device as recited in claim 10, wherein the control circuitry is further configured to:
  estimate a peak current window for the seek of each access command; and
  estimate the combined peak current of both actuators based on an overlap of the peak current windows.

13. The data storage device as recited in claim 12, wherein the peak current window is estimated based on a length of the seek.

14. The data storage device as recited in claim 12, wherein the peak current window corresponds to at least one of an acceleration phase of the seek or a deceleration phase of the seek.

15. The data storage device as recited in claim 10, wherein when the selected execution order results in a concurrent seek of the first and second actuators, the control circuitry is further configured to modify a seek profile of at least the second actuator.

16. The data storage device as recited in claim 15, wherein the control circuitry is further configured to modify the seek profile of at least the second actuator by decreasing an acceleration current applied to the second actuator for a clamp interval of an acceleration phase of the seek profile.

17. The data storage device as recited in claim 16, wherein the control circuitry is further configured to modify the seek profile of at least the second actuator by increasing the acceleration current applied to the second actuator after the clamp interval.

18. The data storage device as recited in claim 15, wherein the control circuitry is further configured to modify the seek profile of at least the second actuator by delaying an acceleration phase of the seek profile.

19. The data storage device as recited in claim 18, wherein the control circuitry is further configured to modify the seek profile of at least the second actuator by increasing a constant velocity phase of the seek profile.

20. A data storage device comprising:
a first disk surface;
a first head;
a first actuator configured to actuate the first head over the first disk surface;
a second disk surface;
a second head;
a second actuator configured to actuate the second head over the second disk surface;
a means for receiving a plurality of access commands from a host;
a means for computing a cost metric for executing a seek to execute each access command of the plurality of access commands, wherein the cost metric is based on an access latency of the seek, a power consumption of the seek, and an estimated combined current draw of the first and second actuators during the seek; and
a means for sorting the access commands into an execution order based on the cost metrics computed for the access commands.

\* \* \* \* \*